(12) United States Patent
Tabata et al.

(10) Patent No.: US 12,000,350 B1
(45) Date of Patent: Jun. 4, 2024

(54) CONTROLLER FOR HYDROGEN ENGINE

(71) Applicant: TOYOTA JIDOSHA KABUSHIKI KAISHA, Toyota (JP)

(72) Inventors: Atsushi Tabata, Okazaki (JP); Koichi Okuda, Toyota (JP); Nobuhiko Satake, Toyota (JP); Daiki Sato, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/492,764

(22) Filed: Oct. 23, 2023

(30) Foreign Application Priority Data

Dec. 20, 2022 (JP) .................................. 2022-203309

(51) Int. Cl.
    *F02D 41/04*      (2006.01)
    *F02D 19/02*      (2006.01)
    *F02D 41/14*      (2006.01)

(52) U.S. Cl.
    CPC ......... *F02D 41/042* (2013.01); *F02D 19/021* (2013.01); *F02D 2041/1472* (2013.01)

(58) Field of Classification Search
    CPC ................. F02D 41/042; F02D 19/021; F02D 2041/1472
    See application file for complete search history.

(56) References Cited

U.S. PATENT DOCUMENTS

2006/0117754 A1 * 6/2006 Hunt ..................... F01N 13/141
    60/651

FOREIGN PATENT DOCUMENTS

| | | | | |
|---|---|---|---|---|
| EP | 2221464 A1 * | 8/2010 | ............. | F02D 21/08 |
| JP | 2008080914 A | 4/2008 | | |
| JP | 2011047282 A | 3/2011 | | |

* cited by examiner

*Primary Examiner* — Jacob M Amick
*Assistant Examiner* — Charles J Brauch

(57) ABSTRACT

A controller for a hydrogen engine is provided. Control circuitry performs, after a stop request for the hydrogen engine, a water reduction process that reduces a proportion of water vapor in exhaust gas. The control circuitry stops the hydrogen engine after operating the hydrogen engine with the water reduction process executed.

4 Claims, 3 Drawing Sheets

CONTROLLER FOR HYDROGEN ENGINE

BACKGROUND

1. Field

The present disclosure relates to a controller for a hydrogen engine.

2. Description of Related Art

In hydrogen engines that use hydrogen gas as fuel, a large amount of moisture is generated during combustion. The generated moisture may cause exhaust system components to be wet. Japanese Laid-Open Patent Publication No. 2011-47282 discloses a technique that adjusts an air-fuel ratio depending on an engine coolant temperature to reduce the proportion of moisture in exhaust gas, thereby preventing the exhaust system components from being wet.

During operation of the hydrogen engine, exhaust gas flows through the exhaust passage. A large amount of moisture generated by combustion is released to external air together with exhaust gas.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect of the present disclosure provides a controller for a hydrogen engine. The controller includes control circuitry. The control circuitry is configured to perform, after a stop request for the hydrogen engine, a water reduction process that reduces a proportion of water vapor in exhaust gas. The control circuitry is configured to stop the hydrogen engine after operating the hydrogen engine with the water reduction process executed.

When the stop request is issued the controller for the hydrogen engine stops the hydrogen engine after operating with the water reduction process executed. The operation after the stop request is performed with the proportion of the water vapor in exhaust gas reduced by the water reduction process. Thus, the amount of moisture remaining in the exhaust passage when the hydrogen engine is in a stopped state is reduced by performing the operation after the stop request. Thus, the controller for the hydrogen engine reduces the amount of water remaining in the exhaust passage after the hydrogen engine is stopped.

In the technique disclosed in the above document, the amount of moisture that is not released to external air together with exhaust gas and remains in the exhaust passage is set to an amount that prevents the exhaust system components from being wet. Accordingly, the expected objective is achieved by decreasing the proportion of moisture in exhaust gas.

However, when the hydrogen engine is stopped, the flow of exhaust gas stops. Thus, the water vapor in the exhaust passage in the stopped state remains in the exhaust passage. Accordingly, the technique described in the above document may be unable to sufficiently reduce the amount of moisture remaining in the exhaust passage after the hydrogen engine is stopped. The above configuration may reduce such a risk.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
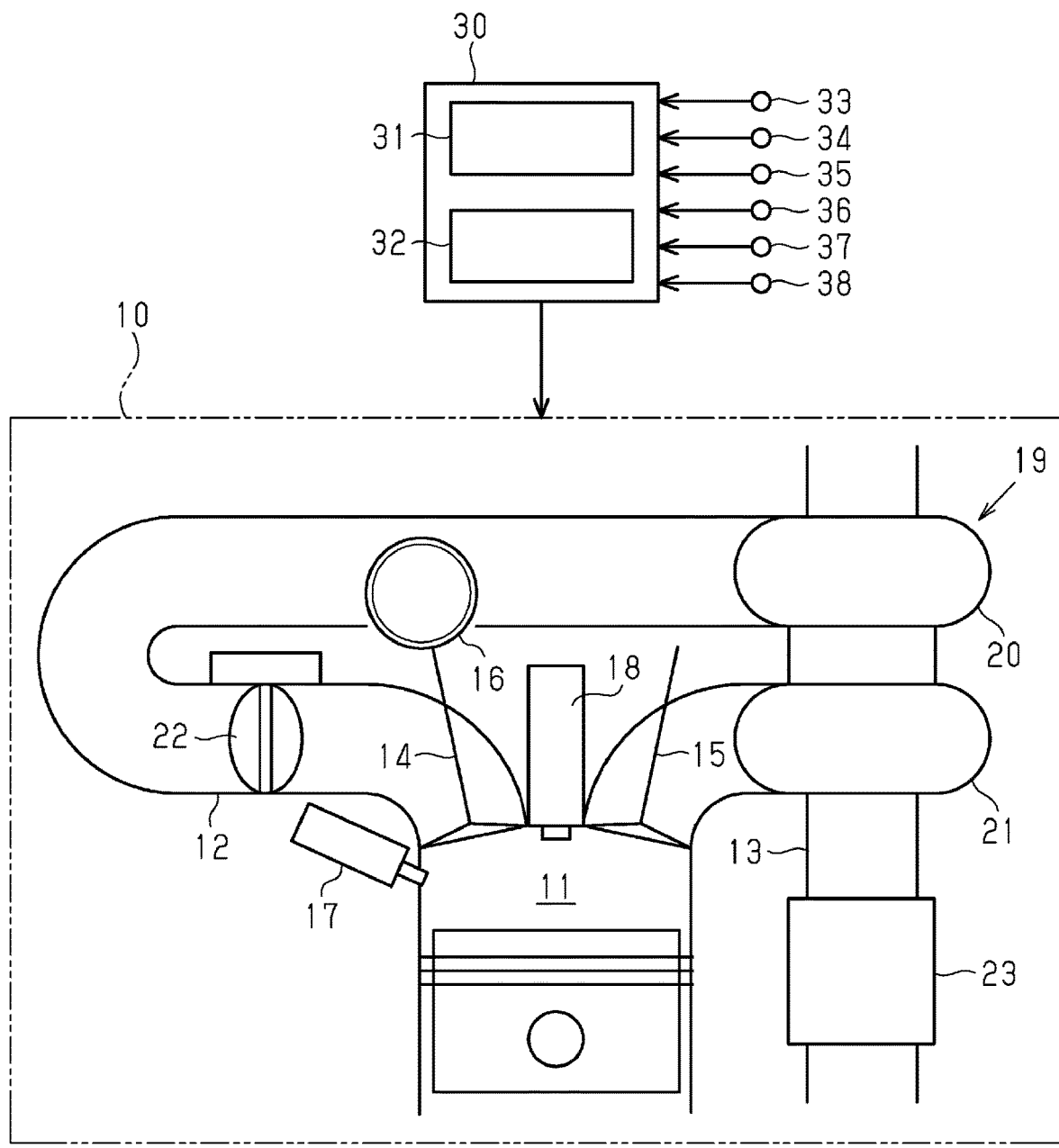
FIG. 1 is a schematic diagram showing the configuration of a controller for a hydrogen engine according to an embodiment.

This description provides a comprehensive understanding of the modes, apparatuses, and/or systems described. Modifications and equivalents of the modes, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A controller for a hydrogen engine according to an embodiment will now be described with reference to FIGS. 1 and 2.

Configuration of Hydrogen Engine

First, the structure of a hydrogen engine 10 to which the present embodiment is applied will be described with reference to FIG. 1. FIG. 1 shows a hydrogen engine 10 and a controller 30 that are installed in a vehicle.

The hydrogen engine 10 includes a combustion chamber 11 that burns air-fuel mixture of hydrogen gas and intake air, an intake passage 12 through which intake air is drawn into the combustion chamber 11, and an exhaust passage 13 out of which exhaust gas is discharged from the combustion chamber 11. The combustion chamber 11 is connected to an intake passage 12 by an intake valve 14 and to an exhaust passage 13 by an exhaust valve 15. Further, the hydrogen engine 10 includes a VVT mechanism 16 that varies the opening-closing timing of the intake valve 14, an injector 17 that injects hydrogen gas into the intake air, and an ignition device 18 that ignites the air-fuel mixture in the combustion chamber 11 by spark discharge. In the case of the hydrogen engine 10 of the present embodiment, the injector 17 is of a direct injection type that injects hydrogen gas into the combustion chamber 11. Further, the hydrogen engine 10 includes a forced induction device 19 of an exhaust turbine type. The forced induction device 19 includes a compressor 20 that is installed in the intake passage 12, and a turbine 21 that is installed in the exhaust passage 13. A throttle valve 22 is arranged in a portion of the intake passage 12 located downstream of the compressor 20. Further, an exhaust system component 23 such as a catalytic converter and a PM filter is provided in the exhaust passage 13.

Configuration of Controller

The configuration of the controller 30, which controls the hydrogen engine 10, will now be described with reference to FIG. 1. The controller 30 is control circuitry that serves as an electronic control unit including a processor 31 and a memory 32. The memory 32 stores programs and data used to control the hydrogen engine 10. The processor 31 executes the programs read from the memory 32. The controller 30 receives detection signals from each of an air flow meter 33, a crank angle sensor 34, an intake air temperature sensor 35, a coolant temperature sensor 36, an ambient temperature sensor 37, and an oil temperature sensor 38. The air flow meter 33 detects an intake air flow rate of the intake passage 12. The crank angle sensor 34 detects the rotation angle of a crankshaft, which is an output shaft of the hydrogen engine 10. The intake air temperature sensor 35 detects the temperature of intake air that has been taken into the intake passage 12. The coolant temperature sensor 36 detects the temperature of coolant in the hydrogen engine 10. The ambient temperature sensor 37 detects the temperature of external air. The oil temperature sensor 38 detects the temperature of lubricating oil in the hydrogen engine 10.

Based on the detection results of the sensors, the controller 30 determines various operation amounts of the hydrogen engine 10 such as the opening/closing timing of the intake valve 14, the injection amount and injection timing of the hydrogen gas, the ignition timing of the air-fuel mixture, and the open degree of the throttle valve 22. Based on the determined operation amounts, the controller 30 controls the hydrogen engine 10 by operating the VVT mechanism 16, the injector 17, the ignition device 18, the throttle valve 22, and the like.

Stop Control

The stop control executed by the controller 30 when a request of stopping the hydrogen engine 10 is issued will now be described. The request of stopping the hydrogen engine 10 may be issued manually or automatically. The manual stop request is a request for stopping the hydrogen engine 10 in response to a stop operation by a driver. The automatic stop request is a request for stopping the hydrogen engine 10 that is automatically performed by travel control of the vehicle. The automatic stop request for the hydrogen engine 10 is issued, for example, at a stopped state such as when waiting at a traffic light. Further, in a case in which the hydrogen engine 10 is mounted on a hybrid electric vehicle, when the hybrid electric vehicle performs electric traveling, the request of stopping the hydrogen engine 10 is automatically issued.

Figure 2:
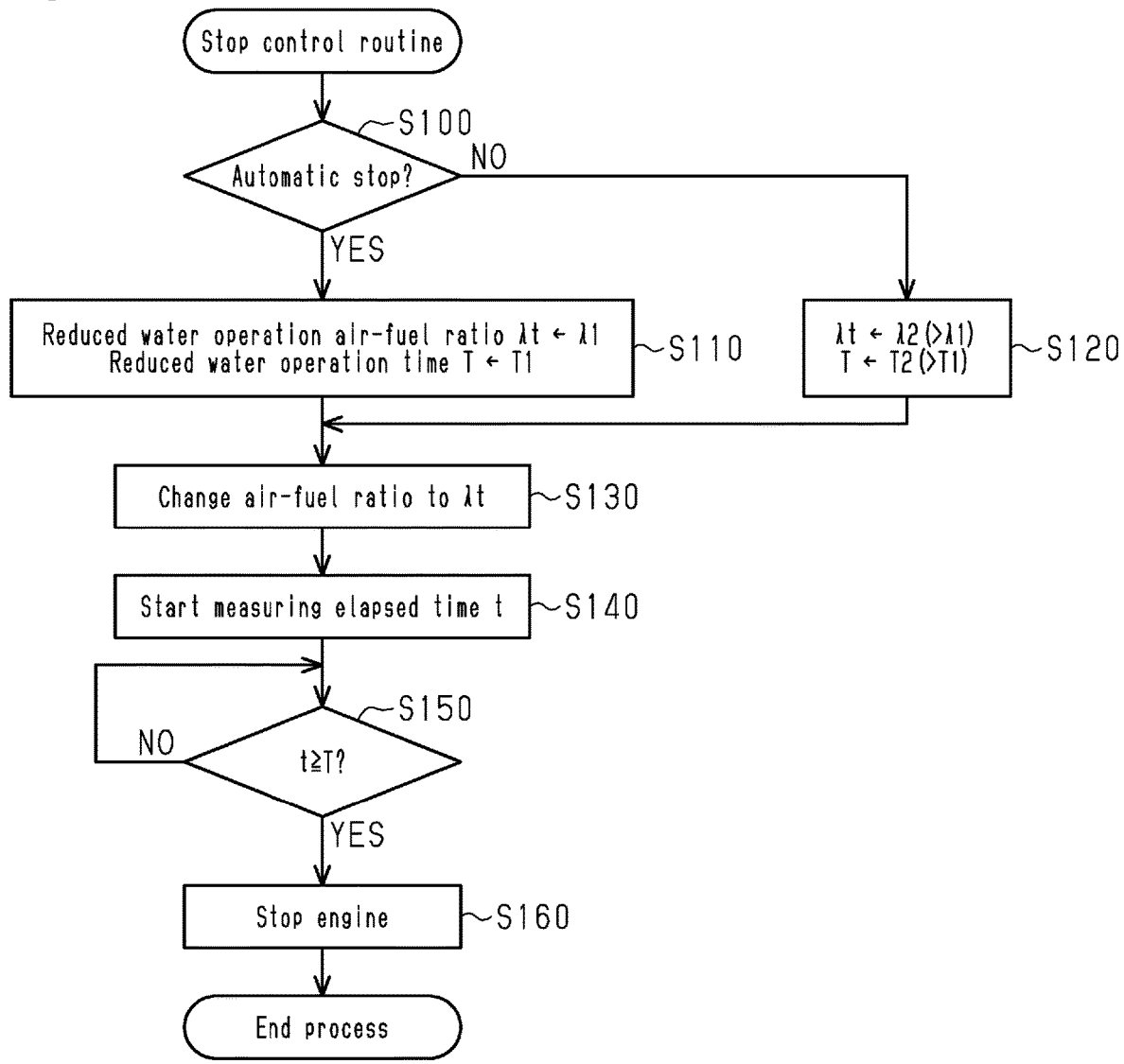
FIG. 2 is a flowchart of a stop control routine executed by the controller of FIG. 1.

FIG. 2 shows a flowchart of a stop control routine executed by the controller 30 when the request of stopping the hydrogen engine 10 is issued. When starting this routine, the controller 30 first determines whether the current stop request is an automatic stop request in step S100.

When the current stop request is an automatic stop request (S100: YES), the controller 30 sets a reduced water operation air-fuel ratio $\lambda t$ to $\lambda 1$ and sets a reduced water operation time T to T1 in step S110. The reduced water operation air-fuel ratio $\lambda t$ set in this step represents the air-fuel ratio of the hydrogen engine 10 that is set by the controller 30 during operation of the hydrogen engine 10 after the stop request is issued. The reduced water operation time T represents the operation time of the hydrogen engine 10 after a stop request is issued. The value $\lambda 1$, to which the reduced water operation air-fuel ratio $\lambda t$ is set, is set to an air-fuel ratio leaner than the air-fuel ratio of the hydrogen engine 10 obtained before the stop request.

When the manual stop request is issued (S100: NO), the controller 30 sets the reduced water operation air-fuel ratio $\lambda t$ to T2 and sets the reduced water operation time T to T2 in step S120. The value of $\lambda 2$ is set to a leaner air-fuel ratio than $\lambda 1$ ($\lambda 1 < \lambda 2$). Further the value of T2 is set to a longer time than T1 (T1<T2).

After executing the process of step S110 or step S120, the controller 30 changes the air-fuel ratio of the hydrogen engine 10 to the reduced water operation air-fuel ratio $\lambda t$ in step S130. Further, in step S140, the controller 30 starts measuring the elapsed time t subsequent to the change in the air-fuel ratio in step S130.

Subsequently, the controller 30 continues to operate the hydrogen engine 10 with the air-fuel ratio set to the reduced water operation air-fuel ratio $\lambda t$ until the elapsed time t reaches the reduced water operation time T. When the elapsed time t reaches the reduced water operation time T (S150: YES), the controller 30 ends the routine after stopping the hydrogen engine 10.

Operation and Advantages of Embodiment

The operation and advantages of the present embodiment will now be described.

In the stop control routine executed at a stop request for the hydrogen engine 10, the controller 30 changes the air-fuel ratio of air-fuel mixture to be burned in the combustion chamber 11 to the reduced water operation air-fuel ratio $\lambda t$ (S130). The reduced water operation air-fuel ratio $\lambda t$ is set to a leaner air-fuel ratio ($\lambda 1$ or $\lambda 2$) obtained before the stop request. The amount of water vapor generated through the combustion of air-fuel mixture in the combustion chamber 11 is proportional to the amount of hydrogen gas in the air-fuel mixture. If the air-fuel ratio is changed to be leaner, the amount of intake air in the air-fuel mixture increases but the amount of hydrogen gas remains the same. Thus, changing the air-fuel ratio to be leaner reduces the proportion of the water vapor in exhaust gas. The controller 30 of the present embodiment executes a process that changes the air-fuel ratio of the air-fuel mixture to be burned to a leaner value than the air-fuel ratio obtained before the stop request, as a water reduction process that reduces the proportion of the water vapor in exhaust gas.

After the stop request of the hydrogen engine 10, the controller 30 stops the hydrogen engine 10 after operating the hydrogen engine 10 with the water reduction process executed. The operation subsequent to the stop request replaces the exhaust gas in the exhaust passage 13 with the exhaust gas having a smaller proportion of water vapor than the proportion of water vapor prior to the stop request. This reduces the amount of water remaining in the exhaust passage 13 after the hydrogen engine 10 is stopped.

Depending on a stop situation of the hydrogen engine 10 (S100), the controller 30 changes the reduced water operation air-fuel ratio λt and the reduced water operation time T (S110, S120). Specifically, the controller 30 changes the reduced water operation air-fuel ratio λt and the reduced water operation time T depending on whether an automatic stop is requested (S100: YES) or a manual stop is requested (S100: NO). The reduced water operation air-fuel ratio λt represents the air-fuel ratio of the hydrogen engine 10 during the operation after the stop request. The reduced water operation time T represents an operation period of the hydrogen engine 10 after the stop request was made. The leaner the air-fuel ratio, the smaller the proportion of the water vapor in the exhaust gas. Thus, depending on the stop situation of the hydrogen engine 10, the controller 30 changes the degree of decrease in the proportion of water vapor in the water reduction process and the period during which the hydrogen engine 10 is operated with the water reduction process executed.

When the hydrogen engine 10 is manually stopped (S100: NO), the hydrogen engine 10 is more likely to be stopped for a longer time than when the hydrogen engine 10 is automatically stopped by the driver (S100: YES). In the case of a short-time stop, the hydrogen engine 10 is restarted before the water vapor in the exhaust passage 13 fully condenses. Thus, in the case of an automatic stop in which the short-time stop is predicted, the exhaust system component 23 is less likely to be wet with water vapor remaining in the exhaust passage 13 in a stopped state than in the case of a manual stop in which a long-time stop is predicted. In the case of the automatic stop (S100: NO), the controller 30 sets the reduced water operation air-fuel ratio λt to the air-fuel ratio λ2. The air-fuel ratio λ2 is leaner than λ1, which is the reduced water operation air-fuel ratio λt in the case of the automatic stop (S100: YES). The controller 30 sets the reduced water operation time T to be longer than T1 in the case of the automatic stop (T2). That is, when the manual stop is made (S100: NO), the controller 30 sets the degree of decrease in the proportion of the water vapor of exhaust gas in the water reduction process to be greater than the degree of decrease in the automatic stop (S100: YES). Further, the controller 30 sets the reduced water operation period (T2) in the case of the manual stop (S100: NO), which is a period during which the hydrogen engine 10 is operated with the water reduction process executed after the stop request, to be longer than the reduced water operation period (T1) in the case of the automatic stop (S100: YES). Thus, the amount of water remaining in the exhaust passage 13 when the hydrogen engine 10 is stopped is reduced to an appropriate amount corresponding to the stop state of the hydrogen engine 10.

The present embodiment has the following advantages.

(1) The controller 30 of the present embodiment stops the hydrogen engine 10 after operating the hydrogen engine 10 with the water reduction process, which reduces the proportion of the water vapor in exhaust gas, executed after the request of stopping the hydrogen engine 10. The operation after the stop request replaces the exhaust gas in the exhaust passage 13 with exhaust gas having a smaller proportion of water vapor than before the stop request. Thus, the controller 30 of the present embodiment reduces the amount of water remaining in the exhaust passage 13 after the hydrogen engine 10 is stopped.

(2) The controller 30 of the present embodiment executes, as the water reduction process, the process of changing the air-fuel ratio of the air-fuel mixture that will be burned in the combustion chamber 11 to be leaner than the value prior to the stop request. The proportion of the water vapor in exhaust gas is proportional to the air-fuel ratio. This facilitates adjustment of the degree of decrease in the proportion of the water vapor in exhaust gas through the water reduction process.

(3) Depending on the stop state of the hydrogen engine 10, the controller 30 of the present embodiment changes the degree of decrease in the proportion of the water vapor in exhaust gas in the water reduction process and the operation period after the stop request with the water reduction process executed. Specifically, when the manual stop is made, the controller 30 sets the degree of decrease in the proportion of the water vapor of exhaust gas in the water reduction process to be greater than the degree of decrease in the automatic stop. Further, in the manual stop, the controller 30 sets the operation period after the stop request with the water reduction process executed to be longer than the operation period in the automatic stop. Accordingly, the amount of water vapor remaining in the exhaust passage 13 when the hydrogen engine 10 is stopped in the manual stop in which the hydrogen engine 10 is expected to be stopped for a relatively long time is smaller than the amount of water vapor remaining in the exhaust passage 13 when the hydrogen engine 10 is automatically stopped. Thus, the amount of water remaining in the exhaust passage 13 when the hydrogen engine 10 is stopped is reduced to an appropriate amount corresponding to the stop state of the hydrogen engine 10.

Modifications

The present embodiment may be modified as follows. The present embodiment and the following modifications can be combined as long as the combined modifications remain technically consistent with each other.

Change in Water Reduction Process and Operation Period after Stop Request Depending on Stop Situation The water vapor remaining in the exhaust passage 13 when the hydrogen engine 10 is in a stopped state may be naturally discharged to external air before the temperature in the exhaust passage 13 decreases to the condensation point of water. The amount of water vapor discharged to external air before being condensed increases as the time for the temperature in the exhaust passage 13 to decrease to the condensation point of the water increases. Thus, the proportion of the amount of water that condenses in the exhaust passage 13 afterward, relative to the amount of water vapor remaining in the exhaust passage 13 when the hydrogen engine 10 is in a stopped state, becomes smaller in a case in which the temperature in the exhaust passage 13 in the stopped state is relatively high than in a case in which the temperature is relatively low. Further, the decrease rate of the temperature in the exhaust passage 13 after the hydrogen engine 10 is stopped becomes lower as the ambient temperature becomes higher. Thus, the higher the ambient temperature, the smaller the proportion of the amount of water that condenses.

To solve such a problem, based on a temperature parameter that indicates the temperature of the hydrogen engine 10 when the hydrogen engine 10 is in a stopped state, a change may be made to the degree of decrease in the proportion of water vapor in the water reduction process and the operation period after the stop request with the water reduction process executed. The temperature parameter may be, for example, the temperature of intake air, coolant, or lubricating oil in the hydrogen engine 10 or may be the ambient temperature.

Figure 3:
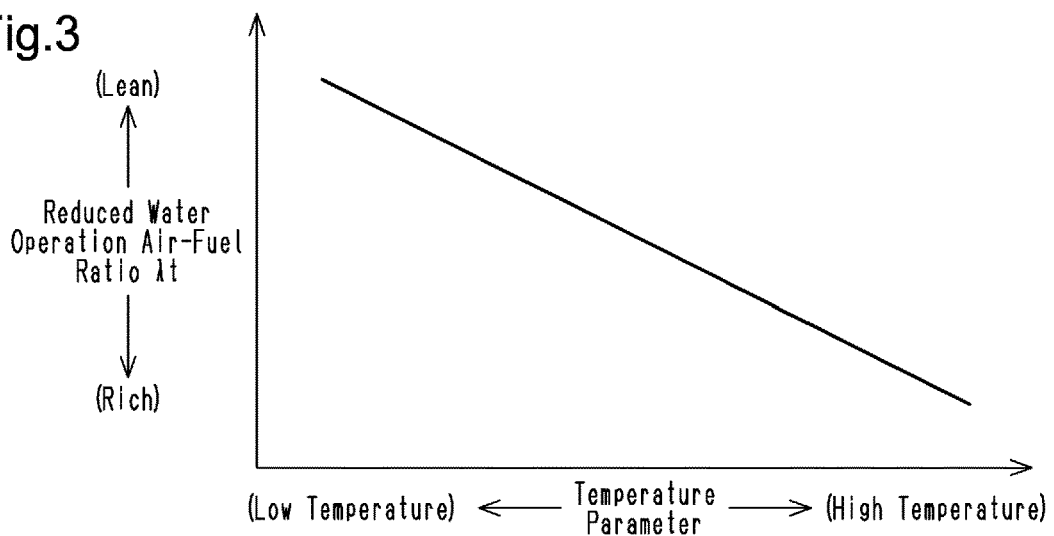
FIG. 3 is a graph showing the relationship between the temperature parameter obtained when the hydrogen engine is stopped and the air-fuel ratio in the reduced water operation shown in FIG. 2.
Figure 4:
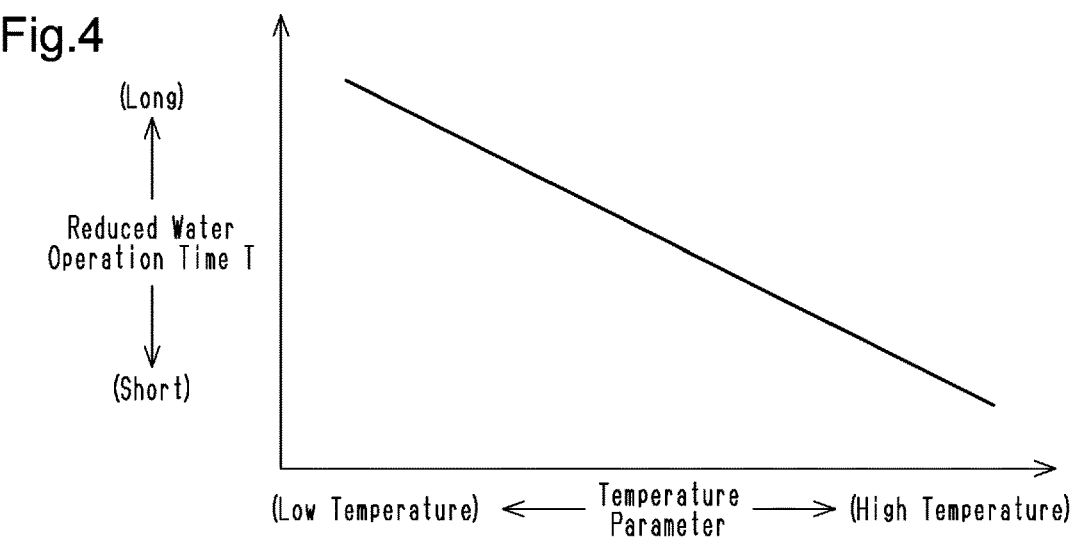
FIG. 4 is a graph showing the relationship between the temperature parameter obtained when the hydrogen engine is stopped and the operation time of the reduced water operation shown in FIG. 2.

FIGS. 3 and 4 respectively show examples of aspects of setting the reduced water operation air-fuel ratio λt and the reduced water operation time T depending on the temperature parameter obtained in a stopped state in the above case. As shown in FIG. 3, in a case in which the temperature parameter in a stopped state of the hydrogen engine 10 is a value indicating a relatively low temperature, the value of the reduced water operation air-fuel ratio λt is set to a leaner air-fuel ratio than in a case in which the temperature parameter is a value indicating a relatively high temperature. As shown in FIG. 4, in a case in which the temperature parameter in a stopped state of the hydrogen engine 10 is a value indicating a relatively high temperature, the value of the reduced water operation time T is set to a shorter time than in a case in which the temperature parameter is a value indicating a relatively low temperature.

Further, in correspondence with the air-fuel ratio of the hydrogen engine 10 before the stop request, the degree of decrease in the proportion of water vapor in the water reduction process and the operation period after the stop request may be changed. The richer the air-fuel ratio, the greater the proportion of the water vapor in exhaust gas. Thus, the amount of the water vapor in the exhaust passage 13 at the stop request is larger when the hydrogen engine 10 is operated at a relatively rich air-fuel ratio before the stop request than when the hydrogen engine 10 is operated at a relatively lean air-fuel ratio before the stop request. To solve this problem, when the air-fuel ratio before the stop request is relatively rich, the reduced water operation air-fuel ratio λt needs to be leaner or the reduced water operation time T needs to be longer in a case in which the air-fuel ratio before the stop request is relatively rich than in a case in which the air-fuel ratio before the stop request is relatively lean.

As described above, the degree of decrease in the proportion of water vapor in the water reduction process and the operation period after the stop request may be changed based on the temperature parameter in a stopped state, the air-fuel ratio before the stop request is issued, and the like. Further, in the above embodiment and the modifications, only one of the reduced water operation air-fuel ratio λt and the reduced water operation time T may be changed depending on the stop state of the hydrogen engine 10. For example, in the stop control routine of FIG. 2, λ1 and λ2 may be each set to a different value, and T1 and T2 may be set to the same value. Further, while λ1 and λ2 are equal to each other, T1 and T2 may be set to different values. Further, the reduced water operation air-fuel ratio λt and the reduced water operation time T may both be fixed regardless of the stop state of the hydrogen engine 10.

Water Reduction Process

The water reduction process, which reduces the proportion of the water vapor in exhaust gas, may be performed using a method other than changing the air-fuel ratio. For example, in the case of a hydrogen engine 10 having a VVT mechanism 16 and a forced induction device 19 as shown in FIG. 1, a process can be executed as the water reduction process to set the valve overlap amount of the intake valves 14 and the exhaust valves 15 to be higher than the valve overlap amount before the stop request. In this case, after the stop request is issued, the controller 30 operates the hydrogen engine 10 in a supercharging range while setting the valve overlap amount to be greater than the valve overlap amount prior to the stop request. As the valve overlap amount increases, the amount of intake air that flows out from the intake passage 12 through the combustion chamber 11 to the exhaust passage 13 increases.

Figure 5:
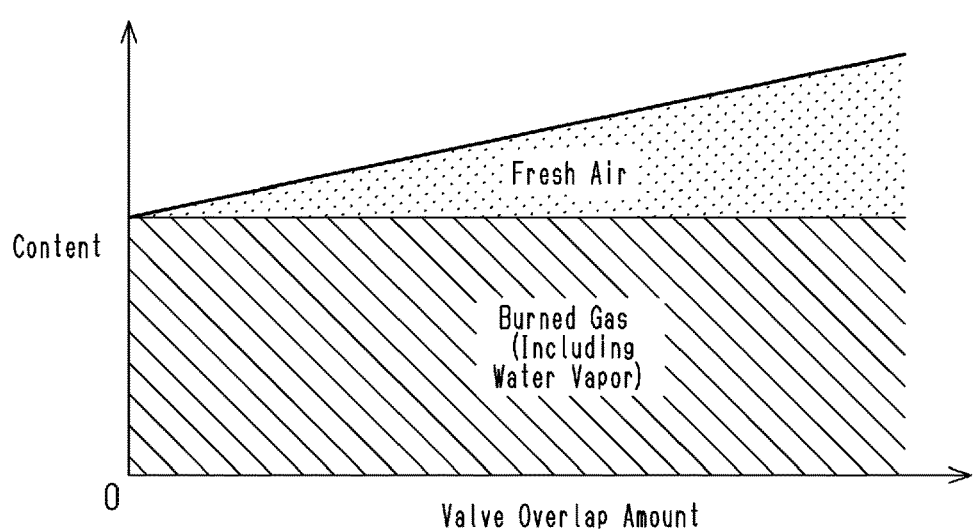
FIG. 5 is a graph showing the relationship between the valve overlap amount of the internal combustion engine of FIG. 1 and the content of each of burned gas and fresh air in exhaust gas.

FIG. 5 shows the relationship between the valve overlap amount and the content of each of burned gas and fresh air in exhaust gas. In this case, only the valve overlap amount is changed while the amount of hydrogen gas and air-fuel ratio of the air-fuel mixture that is to be burned in the combustion chamber 11 remain constant. An increase in the valve overlap amount increases the amount of intake air flowing into the exhaust passage 13 in a state in which fresh air keeps flowing into the combustion chamber 11. Even if the valve overlap amount is changed, the amount of water vapor caused by combustion of hydrogen gas remains unchanged. Thus, the process for increasing the valve overlap amount can be executed as the water reduction process, which reduces the proportion of the water vapor in exhaust gas. In this case, the degree of decrease in the proportion of the water vapor in the water reduction process can be adjusted according to the amount of increase in the valve overlap amount before the stop request is issued.

Others

The controller 30 may set the reduced water operation time T through the following calculation. When calculating the reduced water operation time T, the controller 30 divides the volume of the exhaust passage 13 by the flow rate of exhaust gas obtained after the stop request is issued. Then, the controller 30 sets the reduced water operation time T to the value subsequent to the division. The calculated value of the reduced water operation time T represents the time for the exhaust gas in the exhaust passage 13 at the stop request to be replaced with the exhaust gas generated through the operation after the stop request with the water reduction process executed.

The controller in the above embodiment and the modifications may be applied to a hydrogen engine that differs from the hydrogen engine shown in FIG. 1.

The controller 30 includes the processor 31 and the memory 32 and executes software processing. However, this is merely exemplary. For example, the controller 30 may include a dedicated hardware circuit (such as an ASIC) that executes at least part of the software processes executed in the above embodiment. That is, the controller 30 may be modified as long as it has any one of the following configurations (a) to (c): (a) a configuration including a processor that executes all of the above processes according to programs and a program storage device such as a memory that stores the programs; (b) a configuration including a processor and a program storage device that execute part of the above-described processes according to the programs and a dedicated hardware circuit that executes the remaining processes; and (c) a configuration including a dedicated hardware circuit that executes all of the above-described processes. A plurality of software circuits each including a processor and a program storage device and a plurality of dedicated hardware circuits may be provided. That is, the above-described processes may be executed in any manner as long as the processes are executed by processing circuitry that includes at least one of one or more software circuits and one or more dedicated hardware circuits. The program storage device, that is, a computer-readable medium, includes any medium that can be accessed from a general-purpose computer or a dedicated computer (including a non-transitory computer-readable storage medium).

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A controller for a hydrogen engine, the controller comprising control circuitry configured to:
   perform, after a stop request for the hydrogen engine, a water reduction process that reduces a proportion of water vapor in exhaust gas; and
   stop the hydrogen engine after operating the hydrogen engine with the water reduction process executed, wherein
   the hydrogen engine includes a forced induction device, and
   the water reduction process sets a valve overlap amount of an intake valve and an exhaust valve of the hydrogen engine to be higher than the valve overlap amount obtained before the stop request.

2. The controller according to claim 1, wherein the water reduction process changes an air-fuel ratio of air-fuel mixture to be burned to a leaner value than the air-fuel ratio obtained before the stop request.

3. The controller according to claim 1, wherein the control circuitry is configured to change a degree of decrease in the proportion of the water vapor in the water reduction process depending on a stop situation of the hydrogen engine.

4. The controller according to claim 1, wherein the control circuitry is configured to change, depending on a stop situation of the hydrogen engine, a period during which the hydrogen engine is operated with the water reduction process executed.

* * * * *